US011434142B2

(12) United States Patent
Foxley et al.

(10) Patent No.: US 11,434,142 B2
(45) Date of Patent: Sep. 6, 2022

(54) SODIUM BICARBONATE PRODUCTION

(71) Applicant: Tata Chemicals Europe Limited, Northwich (GB)

(72) Inventors: Christopher Foxley, Northwich (GB); Ladan Iravanian, Chester (GB); Peter Houghton, Northwich (GB)

(73) Assignee: TATA CHEMICALS EUROPE LIMITED, Northwich (GB)

( * ) Notice: Subject to any disclaimer, the term of this patent is extended or adjusted under 35 U.S.C. 154(b) by 2 days.

(21) Appl. No.: 17/271,830

(22) PCT Filed: Aug. 30, 2019

(86) PCT No.: PCT/GB2019/052414
§ 371 (c)(1),
(2) Date: Feb. 26, 2021

(87) PCT Pub. No.: WO2020/044048
PCT Pub. Date: Mar. 5, 2020

(65) Prior Publication Data
US 2021/0253438 A1  Aug. 19, 2021

(30) Foreign Application Priority Data
Aug. 31, 2018 (GB) .................................... 1814209

(51) Int. Cl.
C01D 7/12 (2006.01)
B01D 53/14 (2006.01)
C01D 7/14 (2006.01)

(52) U.S. Cl.
CPC ............ *C01D 7/12* (2013.01); *B01D 53/1425* (2013.01); *B01D 53/1475* (2013.01); *C01D 7/14* (2013.01); *B01D 2252/20478* (2013.01)

(58) Field of Classification Search
CPC ........ C01D 7/12; C01D 7/14; B01D 53/1425; B01D 53/1475; B01D 2252/20478
(Continued)

(56) References Cited
U.S. PATENT DOCUMENTS

2013/0019785 A1  1/2013  Saxena
2020/0002183 A1*  1/2020  Chacartegui Ramirez ................. B01D 53/62

FOREIGN PATENT DOCUMENTS

JP         2012-206872 A    10/2012
WO     WO 2008/143524 A1   11/2008
(Continued)

OTHER PUBLICATIONS

Knuutila, H et al: "CO"2 capture from coal-fired power plants based on sodium carbonate slurry; a systems feasibility and sensitivity study", International Journal of Greenhouse Gas Control, vol. 3, No. 2, Mar. 1, 2009, pp. 143-151.

*Primary Examiner* — Anita Nassiri-Motlagh
(74) *Attorney, Agent, or Firm* — Woodard, Emhardt, Henry, Reeves & Wagner, LLP

(57) ABSTRACT

The present invention relates to a method for the production of sodium bicarbonate, particularly for producing sodium bicarbonate on an industrial scale, the method comprising the steps of: a. treating a carbonaceous feedstock to form a product stream comprising up to 10 v/v % carbon dioxide; b. capturing at least a portion of the carbon dioxide from the product stream to form a carbon dioxide stream; c. feeding the carbon dioxide stream to a reaction vessel; d. feeding an aqueous sodium carbonate solution to the reaction vessel; e. contacting at least a portion of the carbon dioxide stream with at least a portion of the aqueous sodium carbonate solution to form a slurry comprising solid sodium bicarbonate; and f. separating the solid component of the slurry from
(Continued)

the liquid component of the slurry to provide solid sodium bicarbonate and an aqueous liquor.

23 Claims, 4 Drawing Sheets

(58) Field of Classification Search
USPC ........................................................ 423/422
See application file for complete search history.

(56) References Cited

FOREIGN PATENT DOCUMENTS

| | | |
|---|---|---|
| WO | WO 2012/050437 | 4/2012 |
| WO | WO 2016/102568 A | 6/2016 |
| WO | WO 2018/015581 | 1/2018 |

* cited by examiner

SODIUM BICARBONATE PRODUCTION

FIELD OF THE INVENTION

The present invention relates to a method for the production of sodium bicarbonate, particularly for producing sodium bicarbonate on an industrial scale.

BACKGROUND

Sodium bicarbonate has a variety of uses, including food (e.g. raising agents) and medical (e.g. haemo-dialysis) applications. Sodium bicarbonate manufacture is conducted on an industrial scale according to a number of well-known processes. Sodium bicarbonate may, for example, be produced by the ammonia-soda process by collecting the sodium bicarbonate precipitate which forms as an intermediate during this process. However, sodium bicarbonate obtained in this way is typically of relatively low purity.

An alternative process is to react sodium carbonate with carbon dioxide in an aqueous solution according to Equation 1:

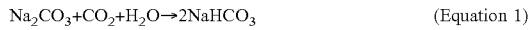
$$Na_2CO_3 + CO_2 + H_2O \rightarrow 2NaHCO_3 \quad \text{(Equation 1)}$$

Industrially, the process shown in Equation 1 may be performed as an extension of the ammonia-soda process. In that case, the sodium carbonate product of the ammonia-soda process is reacted directly with carbon dioxide present in a kiln gas, the kiln gas itself being produced by an independent process of burning coke to decompose calcium carbonate to produce calcium oxide and carbon dioxide to use as feedstocks for the ammonia-soda process. A drawback of this method for the production of sodium bicarbonate is that it is dependent on the ammonia-soda process. The kiln gas may introduce impurities into the sodium bicarbonate. Moreover, as the coke burnt in the kilns may be of variable quality, the nature and quantity of the impurities introduced may also vary. This can lead to difficulties in quality control and quality assurance. Furthermore, such kiln gas is usually poor in carbon dioxide concentration, thereby limiting the efficiency of the reaction to produce sodium bicarbonate.

A further alternative is to react sodium carbonate with carbon dioxide supplied from commercial sources in a stand-alone plant. The commercial source can supply carbon dioxide of the required purity, thereby removing the reliance of the sodium bicarbonate production on the ammonia-soda process and limiting the variability of the carbon dioxide quality being fed to the process.

However, this option requires the sourcing of large quantities of carbon dioxide to use as a raw material. There are also logistical challenges for the transport and storage of the required carbon dioxide.

For food and medical applications of sodium bicarbonate, there is a requirement to adhere to strict quality control standards. Moreover, it is preferred, and in some cases required, that the supply chain of materials used to prepare the sodium bicarbonate be traceable for quality assurance purposes. Given these requirements, a number of commercial sources of carbon dioxide are considered to be unsuitable. An example of a source of carbon dioxide deemed to be suitable for use in generating food or medical grade sodium bicarbonate includes carbon dioxide generated by capture from industrial processes that produce product streams having a relatively high carbon dioxide concentration. These carbon dioxide capture processes typically utilise solvents to adsorb acidic gases from the flue gas. The acidic gases are then desorbed and the carbon dioxide stored for future use. On the other hand, rather than being put to practical use, carbon dioxide in low $CO_2$ content product streams is typically purged to the atmosphere, where it may contribute to global warming.

There exists a need for new processes for producing sodium bicarbonate, particularly on an industrial scale, which are efficient, environmentally friendly (e.g. produce less carbon dioxide waste), produce high purity sodium bicarbonate product (e.g. food grade).

It is an object of the present invention to obviate or mitigate one or more of the aforementioned problems related to the production of sodium bicarbonate, especially on an industrial scale.

SUMMARY OF INVENTION

At its most general, the present invention proposes a process for preparing sodium bicarbonate, suitable for use on an industrial scale, which is able to make use of product streams low in carbon dioxide that are obtained from treatment of carbonaceous feedstocks. Advantageously, the process of the invention is, in embodiments, able to prepare sodium bicarbonate product in high purity from product streams low in carbon dioxide that would conventionally be dismissed for use in such industrial processes. In making use of low $CO_2$ content product streams as a feedstock, the present process is able to make use of a previous unutilised source of $CO_2$ for industrial scale preparation of sodium bicarbonate, which would otherwise be vented to the atmosphere to contribute to global warming. Moreover, the process of the invention is advantageously versatile in that, in embodiments, not only the $CO_2$ but also the heat produced by the carbonaceous feedstock treatment step is used in one or more downstream process steps, thus improving the overall energy efficiency of the process relative to prior art methods of industrial sodium bicarbonate production. For example, heat produced by the carbonaceous feedstock treatment step may be used to generate steam, which in turn may be used to provide heat to other process steps or to produce electricity or condensate for use in other process steps.

In a first aspect, the present invention provides a method for the production of sodium bicarbonate, the method comprising the steps of:
 a. treating a carbonaceous feedstock to form a product stream comprising up to 10 v/v % carbon dioxide;
 b. capturing at least a portion of the carbon dioxide from the product stream to form a carbon dioxide stream;
 c. feeding the carbon dioxide stream to a reaction vessel;
 d. feeding an aqueous sodium carbonate solution to the reaction vessel;
 e. contacting at least a portion of the carbon dioxide stream with at least a portion of the aqueous sodium carbonate solution to form a slurry comprising solid sodium bicarbonate; and
 f. separating the solid component of the slurry from the liquid component of the slurry to provide solid sodium bicarbonate and an aqueous liquor.

The treatment step "a." produces a product stream comprising up to 10% v/v $CO_2$. The step of treating the carbonaceous feedstock may comprise subjecting the carbonaceous feedstock to any suitable reaction conditions known to a skilled person to result in converting the carbonaceous feedstock to carbon dioxide (e.g. oxidation, such as combustion). In some embodiments, treating the carbonaceous feedstock comprises (e.g. consists of) combusting or partially combusting the carbonaceous feedstock.

The treatment of the carbonaceous feedstock may be performed in a power plant. Any power plant which will allow the conditions necessary to convert a carbonaceous feedstock to carbon dioxide may be used. Preferably, combusting the carbonaceous feedstock occurs in a combined heating and power plant ("CHP"). Such power plants have the advantage of producing electricity, heat and/or steam, which may in advantageous embodiments be used in subsequent process steps (thus reducing the overall energy demand of the process). The skilled person will appreciate that such power plants are optimised to produce steam and/or electricity. Carbon dioxide is a by-product, and therefore is of relatively low concentration in the product stream.

Process steps "a." to "f." may advantageously be performed in a single plant (e.g. under one roof), or using integrally connected vessels or plants. By integrally connected, it is meant that the vessels/plants are configured such that one or more materials (such as feedstocks or products) from one vessel or plant are able to travel directly to the other respective vessels/plant for use in subsequent process steps. This may for instance include the transport of the $CO_2$ product stream from the carbonaceous treatment step to a carbon capture vessel/plant, and/or transport of the $CO_2$ stream from the carbon capture vessel/plant to the reaction vessel, and/or the transport of steam and/or electricity from the carbonaceous treatment plant (e.g. the CHP plant) to one or more downstream process steps, and/or transport of water (e.g. from condensate streams) between any of the various process steps, and/or the transport of heat (e.g. via a heat transfer medium, such as steam or hot water or air) between any of the vessels or plants for any of the process steps. Suitable conduits such as piping may be utilised to achieve this integration. By combining a carbonaceous treatment step with sodium bicarbonate synthesis, embodiments of the invention are capable of providing an efficient interconnected process that is synergistic in that materials and energy can be shared between process steps (e.g. between vessels or plants) with little waste, a relatively low carbon footprint and with an overall reduced energy demand compared to prior art industrial processes, such as those which rely on using commercial supplies of $CO_2$.

In some embodiments, the carbonaceous feedstock is a hydrocarbon feedstock. The hydrocarbon feedstock may comprise (or consists essentially of, or consists of) a liquid, solid or gaseous hydrocarbon (i.e. any hydrocarbon which is gaseous under atmospheric conditions). The hydrocarbon feedstock may include methane, ethane, propane, butane, ethene, propene, butene or mixtures of two or more thereof. The hydrocarbon may contain at least 50% w/w methane, ethane, propane, butane, ethene, propene, butene or mixtures of two or more thereof, e.g. at least 60%, 70%, 80% or 90% w/w of methane, ethane, propane, butane, ethene, propene, butene or mixtures of two or more thereof. Optionally, the hydrocarbon feedstock comprises (or consists essentially of, or consists of) natural gas. It may be that methane is the predominant component of the natural gas. Alternatively, the carbonaceous feedstock may comprise, or be, coal, oil, an oil fraction, carbon containing waste products (such as plastic), syngas or a biologically-derived feedstock (e.g. biomass, biodiesel, biomethane, etc.). Natural gas is an advantageous hydrocarbon feedstock as it is easy to source, easily moved between and within sites (e.g. through pipelines) and burns cleanly (e.g. produces little ash or residues compares to other hydrocarbon or carbonaceous feedstocks).

The step of treating carbonaceous feedstock to produce a $CO_2$ product stream is usually an exothermic reaction. This means that heat will be produced in addition to a carbon dioxide stream. In some embodiments, the step of treating the carbonaceous feedstock produces heat and wherein a portion of the heat is used to vaporise a first water stream to form a steam stream. The steam generated using the heat of the carbonaceous feedstock treatment may be used in a number of ways. The steam may for instance be used in electricity production (e.g. by driving a turbine), used as a source of heat for further use in the process (or other processes), and/or may be condensed and recycled as a condensate for further use in the process. Preferably, the steam is used as a source of heat for further use in the process (or other processes), and/or is condensed and recycled as a condensate for further use in the process.

In some embodiments at least a portion of the steam stream (e.g. up to half, at least half or the entire steam stream) is used to generate electricity, optionally wherein the electricity is used to power the apparatus for one or more of the subsequent process steps. By using electricity from the steam stream to power the apparatus for one or more of the subsequent process steps, the process provides a lower net energy demand since heat energy produced by the process is converted to electrical energy which may be harnessed to power the process equipment, or fed into the grid to contribute to net energy supplies.

In advantageous embodiments, a portion of the steam stream is used to provide heat to a downstream steps or features of the process, which may be selected from any one or more of the following: the vaporisation of liquefied carbon dioxide prior to it being fed into the reaction vessel, the reaction vessel, the desorption of carbon dioxide from the solvent, and to the liquor. This may be in addition to, or instead of, using at least a portion the steam stream to generate electricity.

Preferably, the method comprises condensing at least a portion of the steam stream (e.g. up to half, at least half or the entire steam stream) to provide a first condensate stream. This may be in addition to, or instead of, using at least a portion the steam stream to generate electricity and/or may be in addition to, or instead of, using a portion of the steam stream to provide heat to a downstream step in the process as described above. For instance, in some embodiments, the steam stream is used to provide heat to one or more downstream steps in the process (e.g. to the reaction vessel) and the remaining cooled steam stream is used to provide the first condensate stream.

In preferred embodiments, at least a portion of the steam stream is used to generate electricity, to provide heat to a downstream step in the process and to provide a first condensate stream.

The method may further comprise the step of providing water from the first condensate stream to at least one of the first water stream and the aqueous sodium carbonate solution. This is advantageous as the water of the first condensate stream will usually retain residual heat from the treatment step. For instance the water of the first condensate stream may be at least 40° C., at least 50° C., at least 60° C., at least 70° C., at least 80° C., at least 90° C., at least 100° C., or at least 110° C. The water of the first condensate stream may for instance be from about 95-115° C., e.g. about 100-110° C. This means that if the water of the first condensate stream is recycled into the first water stream, the overall energy required to heat the first water stream to boiling to form a steam stream would be lower, thus reducing the overall energy requirements of the process. Moreover, if water in the first condensate stream is recycled by using it to provide water in the aqueous sodium carbonate solution, this also retains heat in the reaction system, thus recycling both heat and water. Recycling water in this way thus reduces the water and heat requirements of the process. This results in an extremely versatile and efficient process for producing sodium bicarbonate.

In some embodiments, the product stream comprises up to 9 v/v % carbon dioxide, such as up to 8 v/v %, up to 7 v/v %, up to 6 v/v %, up to 5 v/v %, up to 4 v/v %, up to 3 v/v %, up to 2 v/v % or up to 1 v/v %. The concentration of carbon dioxide in the product stream may be in the range of from 1-10 v/v %. The concentration of carbon dioxide in the product stream is optionally in the range of from 3-9 v/v %; optionally in the range of from 3-8 v/v %; optionally in the range of from 4-7 v/v %; optionally in the range of from 5-6 v/v %. The skilled person will appreciate that this may be controlled through selection of the carbonaceous feedstock and/or managing the feed rate of the carbonaceous feedstock and any other required reactants (for example, controlling the flowrate of natural gas and air and/or diluent gas into a CHP plant).

In preferred embodiments, capturing the carbon dioxide from the product stream to form the carbon dioxide stream comprises the steps of:
  (a) contacting the product stream with a solvent;
  (b) absorbing carbon dioxide from the product stream into the solvent to form a carbon dioxide enriched solvent; and
  (c) desorbing carbon dioxide from the carbon dioxide enriched solvent to form the carbon dioxide stream.

Thus, in a preferred embodiment, the method comprises the steps of:
  a. treating a carbonaceous feedstock to form a product stream comprising up to 10 v/v % carbon dioxide;
  b. capturing at least a portion of the carbon dioxide from the product stream to form a carbon dioxide stream, wherein the capturing comprises,
    (a) contacting the product stream with a solvent;
    (b) absorbing carbon dioxide from the product stream into the solvent to form a carbon dioxide enriched solvent; and
    (c) desorbing carbon dioxide from the carbon dioxide enriched solvent to form the carbon dioxide stream;
  c. feeding the carbon dioxide stream to a reaction vessel;
  d. feeding an aqueous sodium carbonate solution to the reaction vessel;
  e. contacting at least a portion of the carbon dioxide stream with at least a portion of the aqueous sodium carbonate solution to form a slurry comprising solid sodium bicarbonate; and
  f. separating the solid component of the slurry from the liquid component of the slurry to provide solid sodium bicarbonate and an aqueous liquor.

In embodiments, the product stream may be cooled prior to contacting the solvent. This advantageously removes water from the product stream (e.g. by condensation) and enhances the efficiency of step (b) because the absorption of the gas into the liquid is improved when the gas is at a lower temperature.

Suitable solvents for use in the capture process will be apparent to the skilled person. Preferably the solvent comprises (or consists essentially of, or consists of) an alkanolamine, optionally wherein the alkanolamine is selected from the group consisting of: N-methyldiethanolamine (MDEA), 2-amino-2-methyl-1-proponal (AMP), 2-(diethylamino)-ethanol (DEAE), diisopropanolamine (DIPA), methylaminopropylamine (MAPA), 3-aminopropanol (AP), 2,2-dimethyl-1,3-propanediamine (DM PDA), 3-amino-1-cyclohexylaminopropane (ACHP), diglycolamine (DGA), 1-amino-2-propanol (MIPA), 2-methyl-methanolamine (MMEA), monoethanolamine, diglycolamine, and mixtures thereof.

Desorbing carbon dioxide from the carbon dioxide enriched solvent during the capture step may comprise at least one of heating the solvent and reducing the pressure of the solvent. Advantageously, a portion of the steam stream may be used to heat the solvent. This thus has the benefit of using heat produced by the process itself to provide energy for the desorbing step, thus reducing the overall energy demand of the sodium bicarbonate production process. It will be appreciated that by transferring heat to the solvent for the desorption process, the steam will be cooled, which may typically result in the condensing of at least a portion (e.g. most or all) of the steam stream to form a second condensate stream. In preferred embodiments, the method comprises using the second condensate stream to provide water for at least one of: (a) the first water stream; and (b) the aqueous sodium carbonate solution. As explained above, the recycling of water is advantageous as it reduces the water consumption of the process, and preferably the heat consumption of the process, which in turn increases the overall efficiency of the process. Once carbon dioxide has been desorbed from the solvent, the solvent may be recycled (i.e. used to absorb further carbon dioxide from the product stream). Optionally, should carbon dioxide be desorbed through heating of the solvent, the latent heat of solvent to be recycled may be used to preheat carbon dioxide-laden solvent prior to desorption.

In some embodiments of the method according to the present invention, the carbon dioxide stream is liquefied following its capture. This allows the carbon dioxide to be purified and/or stored and/or transported easily. The liquefied $CO_2$ may optionally be vaporised before supplying to the form a $CO_2$ stream for supply to the reaction vessel. In addition, the carbon dioxide, when allowed to evaporate, may provide its own motive force due to the increase in pressure, thereby obviating the need for pumps. The $CO_2$ stream may alternatively be supplied directly to subsequent reaction steps without prior storage.

In some embodiments the carbon dioxide obtained following capture meets the following criteria:
  a. a carbon dioxide content of at least 99.9 v/v %;
  b. a moisture content of at most 20 ppm;
  c. an ammonia content of at most 2.5 ppm;
  d. an oxygen content of at most 30 ppm;
  e. a nitric oxide content of at most 2.5 ppm;
  f. an nitrogen dioxide content of at most 2.5 ppm;
  g. a non-volatile residue (particulate) content of at most 10 ppm;
  h. a non-volatile organic residue (oil and grease) content of at most 5 ppm;
  i. a volatile hydrocarbon content (calculated as methane) of at most 50 ppm (of which at most 20 ppm may be non-methane hydrocarbons);
  j. an acetaldehyde content of at most 0.2 ppm;
  k. an aromatic hydrocarbon content of at most 0.02 ppm;
  l. a carbon monoxide content of at most 10 ppm;
  m. a methanol content of at most 10 ppm;
  n. a carbonyl sulphide content of at most 0.1 ppm;
  o. a hydrogen sulphide content of at most 0.1 ppm; and
  p. a sulphur dioxide content of at most 1 ppm.

It will be appreciated that ensuring that the carbon dioxide obtained meets the above standards can be achieved by control of usual chemical and process engineering factors (e.g. equipment and operating conditions) and by selection of an appropriate solvent for the absorption of carbon dioxide.

In some embodiments the carbon dioxide stream fed to the reaction vessel has a carbon dioxide concentration in the range of from 20-90 v/v %; optionally in the range of from 25-80 v/v %; such as in the range of from 30-70 v/v %, e.g. from 35-60 v/v %; optionally in the range of from 35-55 v/v %; optionally in the range of from 40-45 v/v %. Optionally, the remainder of the carbon dioxide stream comprises nitrogen or air. Preferably the carbon dioxide stream is formed prior to being fed into the reaction vessel by diluting the captured carbon dioxide with a diluent gas, optionally the diluent gas comprising nitrogen or air.

The term "aqueous sodium carbonate solution" is intended to refer to an aqueous solution which comprises (or in embodiments consists essentially of, or in other embodiments consists of) dissolved sodium carbonate. The aqueous sodium carbonate solution may optionally additionally contain dissolved sodium bicarbonate. In embodiments, the aqueous carbonate solution contains dissolved sodium carbonate as the predominant dissolved component in the solution (that is the component having the highest dry mass content dissolved in the solution), or in embodiments at least 80, 90, or 95% wt of the solution on a dry weight basis is sodium carbonate. A portion of the aqueous sodium carbonate solution may be obtained from the liquor. Preferably the aqueous sodium carbonate solution is obtained by mixing the liquor, sodium carbonate and water.

The reaction vessel may be any suitable reaction vessel capable of accommodating the reactive materials and reaction conditions. It may be equipped with any suitable number of inlets and or outlets for charging the vessel with reactants or extracting products/by-products from the vessel. The vessel may be a batch vessel (e.g. reactor) or a flow vessel (e.g. wherein the reactants are mixed for a period of time that is controlled by the flow rate through the vessel (e.g. through tubing or piping of the vessel). The vessel may contain multiple reaction "zones" whereby distinct steps of the process may be conducted in a stepwise manner. The process may thus be performed in a batch basis or on continuous basis. Typically the process is performed on continuous basis continuous.

The reaction of $CO_2$ with aqueous sodium carbonate in step "e." of the method described herein is well known to the skilled person as described by Equation 1 in the introduction portion of this description. The skilled person will thus be able to identify suitable process conditions (temperature/pressure/concentration/reactant stoichiometry) to perform the reaction effectively.

It will appreciated that, in embodiments, the aqueous liquor will be an alkaline aqueous liquor. In some embodiments, the liquor comprises aqueous sodium bicarbonate and aqueous sodium carbonate. The method may further comprise the step of heating the liquor to convert at least a portion of the aqueous sodium bicarbonate to aqueous sodium carbonate, carbon dioxide and water. The liquor may be heated to a temperature of at least 50° C. It may for instance be heated to a temperature of at least 60° C., 70° C., 80° C., 90° C. or 95° C. The liquor may for instance be heated to a temperature of around 90-105° C. The skilled person will appreciate that converting a portion of the sodium bicarbonate to sodium carbonate is advantageous as the sodium carbonate is more soluble in water that the bicarbonate. This therefore increases the ability of the liquor to dissolve further sodium carbonate. This is particularly advantageous in embodiments of the invention wherein the liquor is recycled and fed back into the reactor. The heat used to heat the liquor may be provided by at least a portion of the steam stream. During this process, heat from the steam is transferred to the liquor, thus cooling the steam. Accordingly in some embodiments, the provision of heat to the liquor by the steam stream causes at least some of the steam to cool and condense to form a third condensate stream.

In some embodiments, the method comprises providing water from the third condensate stream to at least one of the first water stream and the aqueous sodium carbonate solution. As explained above, the recycling of water is advantageous as it reduces the water consumption of the process, and preferably the heat consumption of the process, which in turn increases the overall efficiency of the process.

As described above, at least a portion (e.g. all) of the sodium carbonate may remain dissolved in the liquor during the step of heating the liquor. Moreover the carbon dioxide formed following heating of the liquor may be collected to form a $CO_2$ off-gas. It will be appreciated by the skilled person that the $CO_2$ off-gas will typically be relatively hot following the step of heating the liquor (e.g. hotter than ambient and typically at least 50° C., at least 60° C., at least 70° C., at least ° C., at least 90° C., or at least 95° C. In some embodiments the method further comprises cooling the $CO_2$ off-gas using a second water stream to produce a cooled carbon dioxide stream and a heated water stream.

At least a portion (e.g. all) of the heated water stream may be used to form the first water stream. That is, in embodiments, the first water stream (used to generate the steam stream) may comprise water from the heated water stream. Supplying warm water from the heated water stream to the first water stream has the advantage that the overall energy required to heat the first water stream to boiling to form the steam stream is reduced, thus further increasing the overall efficiency of the process.

It may be the case that not all $CO_2$ in the carbon dioxide stream supplied to the reaction vessel reacts with sodium carbonate to form sodium bicarbonate. Such unreacted carbon dioxide may thus be collected for further use or, preferably for recycling back into the reaction vessel. Thus, in some embodiments, a portion of the carbon dioxide stream which does not react with the aqueous sodium bicarbonate solution in the reaction vessel is formed into a carbon dioxide waste stream.

In some embodiments of the method according to the present invention, there is provided a method for the production of sodium bicarbonate wherein carbon dioxide from at least one of (such as two of, e.g. a+b or a+c, or all three of): (a) the $CO_2$ off-gas; (b) the cooled carbon dioxide stream; and (c) the carbon dioxide waste stream is recycled by feeding it into the reaction vessel. This is advantageous as it simultaneously increases the $CO_2$ efficiency of the process and reduces the amount of greenhouse gas vented to the atmosphere.

Also provided by the present disclosure is solid sodium bicarbonate prepared by a process according to any method described herein.

Also provided by the present disclosure is a slurry comprising solid sodium bicarbonate dispersed in an aqueous solution comprising sodium carbonate, sodium bicarbonate and carbon dioxide as prepared following step "e." of the method described herein.

DETAILED DESCRIPTION OF THE INVENTION

Specific embodiments of the present invention will now be described, by way of example only, with reference to the accompanying drawings briefly described above.

The present invention relates to a method for the production of sodium bicarbonate. More specifically, the present invention relates to a method for the production of sodium bicarbonate which is suitable for use on an industrial scale and which can be operated independently of the ammonia-soda process and is not reliant on the provision of carbon dioxide from an external source. The process is able to make use of carbon dioxide product streams that are low in $CO_2$ as obtained from the treatment of carbonaceous feedstocks.

Figure 1:
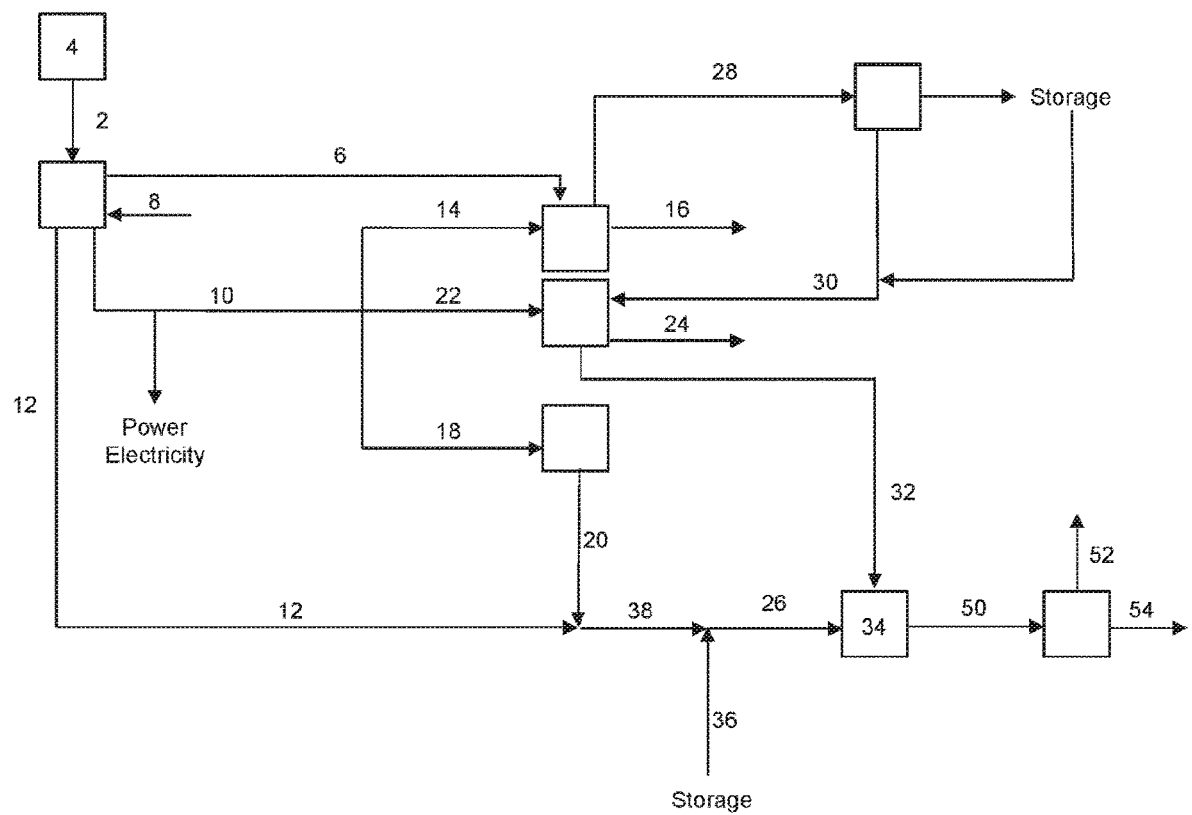
FIG. 1 is a schematic depicting a method according to the present invention.

FIG. 1 depicts a schematic of a method according to the present invention. A carbonaceous feedstock 2, comprising a carbonaceous material, is provided from a carbonaceous material source 4. The carbonaceous material may be any carbonaceous material suitable for reacting to produce a product stream 6 comprising up to 10 v/v % carbon dioxide. The carbonaceous material may comprise or consist of one or more hydrocarbons. The carbonaceous material may be a fossil fuel such as coal, oil or natural gas. The carbonaceous material is preferably natural gas. Alternatively the carbonaceous material may a renewable such as biomass, biodiesel, bioethanol, and the like. Treating (i.e. reacting) the carbonaceous material to produce $CO_2$ will usually produce heat. Treating the carbonaceous material may comprise combusting the carbonaceous material. The carbonaceous material may be combusted in a combined heating and power plant. In the exemplary embodiment depicted, a portion of the heat produced is used to convert a first water stream 8 into a steam stream 10.

A portion of the steam stream may then be used to provide heat. FIG. 1 depicts portions 14, 22 and 18 of steam stream 10. Transfer of heat from portions of steam stream 10 to other parts of the process may be performed by direct fluid contact of the steam with the object or substance to be heated. Alternatively, the heat may be provided without direct fluid contact of the steam stream and the object or substance to be heated, such as via a heat-conducting medium. In other words, the steam stream 10, or portions thereof, may act as a heat exchange medium and the act of heat exchange may take place in any suitable form of heat exchanger apparatus known to one skilled in the art (e.g. a plate, plate-fin or shell and tube heat exchanger). A portion of the steam stream 10 may be used to provide heat to any combination of the following: the vaporisation of liquefied carbon dioxide prior to it being fed into the reaction vessel, the desorption of carbon dioxide from the solvent, and to the liquor.

A portion of the steam stream may be used to provide heat to other processes (i.e. other industrial operations such as an ammonia-soda process) or to commercial or domestic properties. By utilising the heat energy present in portions of the steam stream to perform useful work, the need for the generation of additional heat is reduced, thereby improving the overall efficiency of the sodium bicarbonate production method and lowering the energy requirements of any apparatus used to enact the method.

The provision of heat by the steam stream 10 (which would otherwise be dissipated and lost) to other processes in the method of the present invention may be used to supplement, or replace, conventional sources of heating such as burners or electrical heating apparatus. By doing so, the energy efficiency of the method is advantageously improved.

The supply of heat by a portion of the steam stream to any of the aforementioned processes may result in said portion of the steam stream condensing to form a condensate stream. A plurality of portions of the steam stream may each condense to form separate condensate streams. Alternatively, or additionally, a portion of the steam stream 10 may be used to provide a first condensate stream 12 without providing heat to any particular process, for example by simply losing heat to the surrounding environment (e.g. in an air condenser or water-cooling tower) or in unrelated procedures (e.g. other industrial plants). As depicted in FIG. 1, a portion 14 of the steam stream 10, used to provide heat for the desorption of carbon dioxide from the solvent, may produce a condensate stream 16 (referred to herein as the second condensate stream). Moreover, a portion 18 of the steam stream 10 used to provide heat to the liquor may produce a condensate stream 20 (referred to herein as the third condensate stream). A portion 22 of the steam stream 10 used to provide heat to the vaporisation of the liquefied carbon dioxide may produce a fourth condensate stream 24.

The condensate streams being produced by the evaporation and condensation of water may be used for applications where water is required. In particular, the water may be used where water of a suitably high purity is required because the steps of evaporation and condensation would typically have removed a significant amount of any impurities present.

Any one or combination of condensate streams may be used to dissolve the sodium carbonate to form an aqueous sodium carbonate solution 26. FIG. 1 illustrates the first condensate stream 12 being used to provide water to a water stream 38 to form aqueous sodium carbonate solution 26. This is advantageous as it mitigates or obviates the need to provide high purity water which would otherwise be required to make up the volume of the aqueous sodium carbonate solution.

Figure 3:
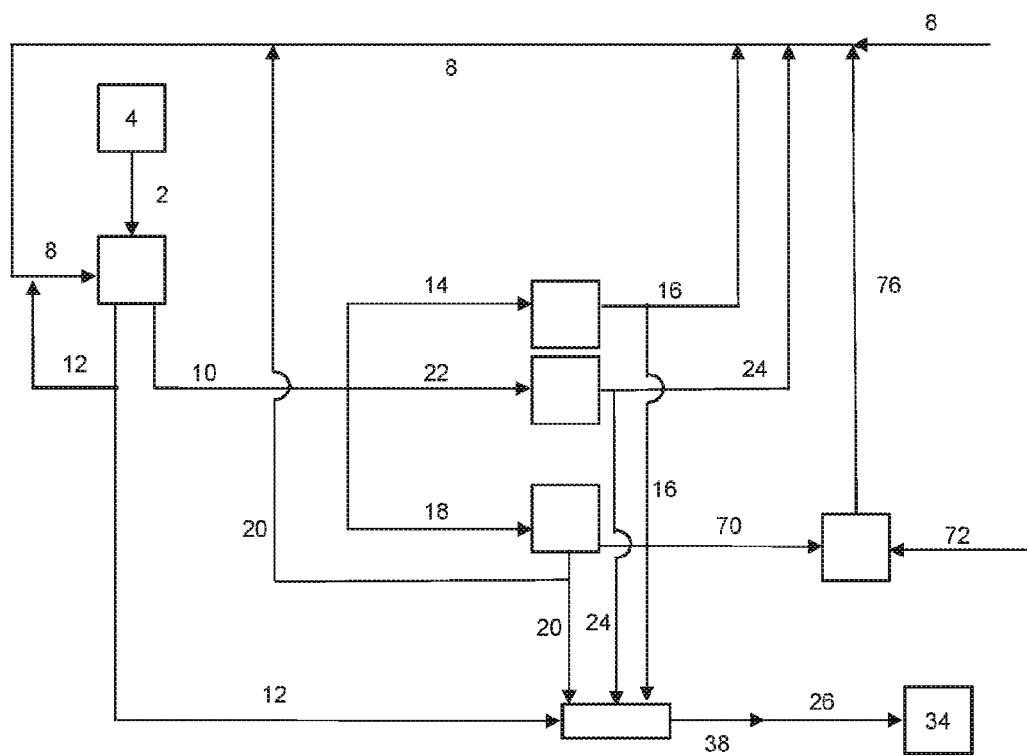
FIG. 3 is a schematic depicting the relationship between condensate streams, steam streams and water streams.

Any one or combination of condensate streams may be used to supply water for the first water stream 8. Additionally, raw water, such as river water or bore hole water, may be used to supply water for the first water stream 8. FIG. 3 depicts condensate streams 12, 16, 20, 24 and 76 supplying the first water stream 8. This is advantageous as any residual heat in the condensate streams will warm the first water stream, thus reducing the amount of additional heat energy necessary to be provided by the carbonaceous treatment step to boil the first water stream to produce the steam stream, thus increasing the process efficiency.

A portion of the steam stream 10 may be used to generate electricity. The generation of electricity from a portion of the steam stream may be achieved by any method known to one skilled in the art, for example by feeding a high-pressure steam stream to a turbine. Electricity generated by the steam stream may be used to provide power to the processes used in the method for the production of sodium bicarbonate. Additionally, or alternatively, the electricity may be used to provide power to other industrial processes or fed into a local electricity network for consumption by other users. The electricity may be used for any combination of the following processes: ancillary controls and sensors, pumps, motors, fans, compressors, valves, heaters and coolers which are required to enact the method for the production of sodium bicarbonate; separating the slurry; providing heat to the carbon dioxide enriched solvent; reducing the pressure of the carbon dioxide enriched solvent; providing heat to the liquor; and drying the solid sodium bicarbonate product.

The product stream 6 produced by treating the carbonaceous feedstock comprises carbon dioxide. It may comprise carbon dioxide in the amounts already described herein. The $CO_2$ concentration may be up to 10 v/v %. Alternatively, the product stream 6 may comprise carbon dioxide in an amount up to 9 v/v %; optionally in an amount up to 8 v/v %; optionally in an amount up to 7 v/v %; optionally in an amount up to 6 v/v %; optionally in an amount up to 5 v/v %; optionally in an amount up to 4 v/v %. Alternatively, the product stream 6 may contain carbon dioxide in a concentration in the range of from 1 to 10 v/v %; optionally in the range of from 2 to 9 v/v %; optionally in the range of from 3 to 8 v/v %; optionally in the range of from 4 to 7 v/v %; optionally in the range of from 5 to 6 v/v %. Alternatively, the product stream 6 may contain carbon dioxide in a concentration of about 10 v/v %. Alternatively the product stream 6 may contain carbon dioxide in a concentration of about 9 v/v %. Alternatively the product stream 6 may contain carbon dioxide in a concentration of about 8 v/v %. Alternatively the product stream 6 may contain carbon dioxide in a concentration of about 7 v/v %. Alternatively the product stream 6 may contain carbon dioxide in a concentration of about 6 v/v %. Alternatively the product stream 6 may contain carbon dioxide in a concentration of about 5 v/v %. Alternatively the product stream 6 may contain carbon dioxide in a concentration of about 4 v/v %.

Alternatively the product stream 6 may contain carbon dioxide in a concentration of about 3 v/v %. Alternatively the product stream 6 may contain carbon dioxide in a concentration of about 2 v/v %.

The product stream 6 may also comprise other gases. Other gases may include one or more of nitrogen, sulphur dioxide, carbon monoxide, water or any other gas which may be produced from combustion of the carbonaceous feedstock 2.

The carbon dioxide in the product stream 6 is captured in processes of the invention. "Captured" in this context is intended to mean that the carbon dioxide is separated from the other components of the product stream 6 by removing the carbon dioxide from the other components, removing the other components from the carbon dioxide or a combination thereof. It is not required for the capturing process to capture all of the carbon dioxide from the product stream 6. The capturing process may capture only a portion of the carbon dioxide present in the product stream 6. The capturing process may capture 30 to 98% of the carbon dioxide present in the product stream 6. The capturing process may capture 50 to 95% of the carbon dioxide present in the product stream 6. The capturing process may capture 70 to 90% of the carbon dioxide present in the product stream 6.

In order to capture the carbon dioxide, the product stream is in this exemplary embodiment contacted with a solvent, such that the carbon dioxide is absorbed into the solvent to form a carbon dioxide enriched solvent. The carbon dioxide is then desorbed from the carbon dioxide enriched solvent to form a carbon dioxide stream 28. Preferred methods of capturing carbon dioxide include the use of basic solvents such as amine-based solvents. Particularly preferred solvents include those described herein, such as solvents comprising an alkanolamine, optionally wherein the alkanolamine is selected from: N-methyldiethanolamine (MDEA), 2-amino-2-methyl-1-proponal (AMP), 2-(diethylamino)-ethanol (DEAE), diisopropanolamine (DIPA), methylaminopropylamine (MAPA), 3-aminopropanol (AP), 2,2-dimethyl-1,3-propanediamine (DMPDA), 3-amino-1-cyclohexylaminopropane (ACHP), diglycolamine (DGA), 1-amino-2-propanol (MIPA), 2-methyl-methanolamine (MMEA), monoethanolamine, diglycolamine, and mixtures of two or more thereof. Any other suitable solvents may also be used that would be apparent to the skilled person to be capable or absorbing carbon dioxide from the product stream 6.

Desorbing the carbon dioxide from the carbon dioxide enriched solvent may require heating the carbon dioxide enriched solvent and/or by exposing the carbon dioxide enriched solvent to reduced pressure. Once desorbed, the carbon dioxide is extracted as carbon dioxide stream 28. As discussed above, in preferred methods, a portion 14 of steam stream 10 is used to heat the solvent. In an exemplary embodiment, as heat from portion 14 of steam stream 10 is transferred to the carbon dioxide enriched solvent, the steam condenses to form a second condensate stream 16. Preferably, the second condensate stream 16 provides water to the first water stream 8 and/or to the aqueous sodium carbonate stream 26, as depicted in FIG. 3.

The quantity of carbon dioxide captured is sufficient to supply the method for the production of sodium bicarbonate. By capturing the carbon dioxide in this way, its purity can be increased and readily controlled, such as by liquefying the $CO_2$, membrane separation, or distillation, or the like. This therefore obviates the need to source additional carbon dioxide from other sources of lower purity (e.g. lime kilns) or at greater cost (e.g. commercially sourced carbon dioxide).

The volume of carbon dioxide captured may be in excess of what is required by the method for the production of sodium bicarbonate. The amount of carbon dioxide captured, desorbed and liquefied from the product stream 6 over a given time period, may exceed the amount of carbon dioxide consumed by the method for the production of sodium bicarbonate over an equivalent time period. Any excess carbon dioxide may be liquefied and stored. Following desorption from the solvent, any suitable method for liquefying the captured carbon dioxide may be used. Liquefaction of the carbon dioxide advantageously provides a supply of carbon dioxide in a reduced volume, thereby facilitating easier storage. Stored carbon dioxide may be used to provide carbon dioxide to the method for the production of sodium bicarbonate during periods of maintenance, it may be used in other processes as a raw material, it may be provided to other users of carbon dioxide or any combination thereof.

The carbon dioxide stream obtained following capture may comprise at least 95% carbon dioxide, preferably at least 97.5% carbon dioxide and most preferably at least 99.9% carbon dioxide. In preferred embodiments the carbon dioxide obtained following capture and, optionally, liquefaction may meet the quality criteria for food or pharmaceutical grade carbon dioxide. For instance, the carbon dioxide obtained following capture may further comprise water of at most 40 ppm, preferably at most 30 ppm and most preferably at most 20 ppm. The carbon dioxide captured may also comprise amounts of one or more of: ammonia at most 2.5 ppm, oxygen at most 30 ppm, nitric oxide at most 2.5 ppm, nitrogen dioxide at most 2.5 ppm, non-volatile residue (such as particulates) at most 10 ppm, non-volatile organic residue (such as oil and grease) at most 5 ppm, volatile hydrocarbons (such as methane, ethane, propane or similar) at most 50 ppm, acetaldehyde at most 0.2 ppm, aromatic hydrocarbons at most 0.02 ppm, carbon monoxide at most 10 ppm, methanol at most 10 ppm, carbonyl sulphide at most 0.1 ppm, hydrogen sulphide at most 0.1 ppm and sulphur dioxide at most 1 ppm.

The carbon dioxide is usually provided in gaseous form to the reaction vessel for use in the method for production of sodium bicarbonate. Liquid carbon dioxide stream 30 may thus be vaporised to produce a vaporised carbon dioxide stream 32. Any suitable method can be used for vaporising the liquid carbon dioxide stream 30. FIG. 1 depicts a portion 22 of steam stream 10 providing the source of heat to the liquid carbon dioxide stream 30 to produce vaporised carbon dioxide stream 32. Preferably, the portion 22 of steam stream 10 is under low pressure. In some embodiments, at least a portion of the liquefied carbon dioxide stream 30 is provided from a storage container of stored carbon dioxide that has been captured, desorbed and liquefied as described above.

Vaporised carbon dioxide stream 32 is fed into the reaction vessel 34 having a carbon dioxide concentration in the range of 20-90 v/v %; optionally in the range of 25-80 v/v %; optionally in the range of 30-70 v/v %; optionally in the range of 35-60 v/v %; optionally in the range of 35-55 v/v %; optionally in the range of 40-45 v/v %, optionally wherein the remainder of the carbon dioxide stream 32 comprises nitrogen or air. Preferably, the vaporised carbon dioxide stream 32 is diluted with a diluent gas such as nitrogen, air, or other suitable gases prior to providing it to the reaction vessel. Suitably the diluent gas is typically inert under the reaction conditions required for sodium bicarbonate production.

Aqueous sodium carbonate stream 26 is fed into the reaction vessel 34. In the reaction vessel 34, vaporised carbon dioxide stream 32 is mixed with aqueous sodium carbonate stream 26.

Providing the sodium carbonate stream 26 in an aqueous solution provides the water necessary for the sodium bicarbonate reaction to proceed, as set out in Equation 1. Without wishing to be bound by theory, it is thought that the reaction according to Equation 1 may exist as equilibrium, therefore having a forward and backward reaction, dependent on reaction conditions. The reaction vessel 34 may be operated at any temperature suitable for the forward reaction according to Equation 1 to be favoured over the backward reaction. The reaction vessel 34 may be operated at any pressure suitable for the forward reaction according to Equation 1 to be favoured over the backward reaction.

To produce aqueous sodium carbonate stream 26, sodium carbonate feed 36 is provided, which supplies solid sodium carbonate. In embodiments, the sodium carbonate feed 36 is connected to a storage container which contains a source of solid sodium carbonate. Preferably the storage container is a silo. Preferably the source of solid sodium carbonate is soda ash. Solid sodium carbonate is drawn out of the storage container by means of sodium carbonate feed 36 at a desired rate. The rate at which the sodium carbonate feed 36 provides solid sodium carbonate to the aqueous sodium carbonate feed 26 can be manipulated according to the rate at which sodium carbonate is being consumed by the method for production of sodium bicarbonate.

At least a portion of sodium carbonate feed 36 may be contacted with a water stream 38 and/or treated liquor stream 56 to afford the aqueous sodium carbonate stream 26. At least a portion of the sodium carbonate provided by sodium carbonate feed 36 is substantially dissolved on contact with the water of water stream 38 to form the aqueous solution 26. Preferably, the concentration of the sodium carbonate solution formed is up to 10 M. More preferably, the concentration is between 1 M and 5 M. Most preferably, the concentration is around 2.5 M.

Water stream 38 may be provided by any combination of condensate streams. FIG. 1 depicts first condensed stream 12 and third condensate stream 20 providing water to water stream 38. FIG. 3 depicts first 12, second 16, third 20, and fourth 24 condensate streams supplying water stream 38. Water stream 38 may be supplied by one or more of the first condensate stream 12, the second condensate stream 16, the third condensate stream 20 and the fourth condensate stream 24. One or more of the first 12, second 16, third 20, and fourth 24 condensate streams may supply water directly to the aqueous sodium carbonate solution 26.

A portion 18 of steam stream 10 provides heat to water stream 38 and/or the aqueous sodium carbonate stream 26. Without wishing to be bound by theory, it is thought that heating water stream 38 and/or the aqueous sodium carbonate stream 26 accelerates the rate of, and increases the efficiency of, dissolving sodium carbonate in the aqueous sodium carbonate stream 26. On cooling of portion 18, the water is condensed to provide third condensate stream 20, which as discussed above may supply water stream 38. Other portions of steam stream 10 may also be used to heat water stream 38.

Dissolving sodium carbonate to form an aqueous solution is an exothermic process. As such, the sodium carbonate stream 26 becomes heated as the aqueous sodium carbonate solution forms. The sodium carbonate stream 26 may therefore require temperature regulation before entering the reaction vessel 34. The sodium carbonate stream 26 may require cooling, or alternatively may require heating. Cooling and/or heating may be achieved by contacting stream 26 with a heat exchange medium, and the act of heat exchange may take place in any suitable form of heat exchanger apparatus known to one skilled in the art (e.g. a plate, plate-fin or shell and tube heat exchanger). It is contemplated that the sodium carbonate stream may require heating if, for example, the sodium carbonate stream 26 is dilute and as such, the thermal energy generated by the dissolving of sodium carbonate is dissipated throughout a larger volume of water. As discussed above, portion 18 of steam stream 10 may provide heat to the aqueous sodium carbonate stream 26.

It is contemplated that one or more of the sodium carbonate feed 36, water stream 38, liquor stream 56 and vaporised carbon dioxide stream 32 may be fed directly into reaction vessel 34 (not illustrated). In such embodiments, the water stream 38 and/or liquor stream 56 may dissolve the sodium carbonate provided by a sodium carbonate feed to afford an aqueous sodium carbonate solution in the reaction vessel 34 in situ.

It is also contemplated that the sodium carbonate feed 36 and an aqueous carbon dioxide solution may be fed directly into the reaction vessel 34 (not illustrated). In embodiments, the aqueous carbon dioxide solution may be an aqueous solution saturated with carbon dioxide. The aqueous carbon dioxide solution may comprise carbonic acid. It is contemplated that in such embodiments the vaporised carbon dioxide stream 32 would be contacted with water stream 38 to form an aqueous carbon dioxide solution before entering the reaction vessel. The sodium carbonate contacts the aqueous carbon dioxide solution to afford an aqueous sodium carbonate solution in the reaction vessel 34 in situ.

In the reaction vessel 34 at least a portion of the vaporised carbon dioxide stream 32 is treated with at least a portion of sodium carbonate stream 26. At least a portion of the water stream 38 used to form sodium carbonate stream 26 is consumed in the reaction, according to Equation 1 to form the sodium bicarbonate product.

The reaction according to Equation 1 to produce sodium bicarbonate is an exothermic reaction. As such, reaction vessel 34 may experience temperature fluctuations and as such require cooling and/or heating. In some embodiments, excess heat produced in reaction vessel 34 is used to heat at least a portion of water stream 38. Cooling and/or heating of the reaction vessel 34 may be achieved with a suitable heat exchange medium, and the act of heat exchange may take place in any suitable form of heat exchanger apparatus known to one skilled in the art (e.g. a plate, plate-fin or shell and tube heat exchanger). In embodiments, water stream 38 is in thermal communication with reaction vessel 34, the water thereof acting as a heat sink and becoming heated by reaction vessel 34. Advantageously, heating water stream 38 with heat generated in the reaction vessel 34 increases the rate at which sodium carbonate 36 dissolves to form aqueous sodium carbonate solution 26. Portions of the steam stream 10 may be used in heating of the reaction vessel 34.

Figure 4:
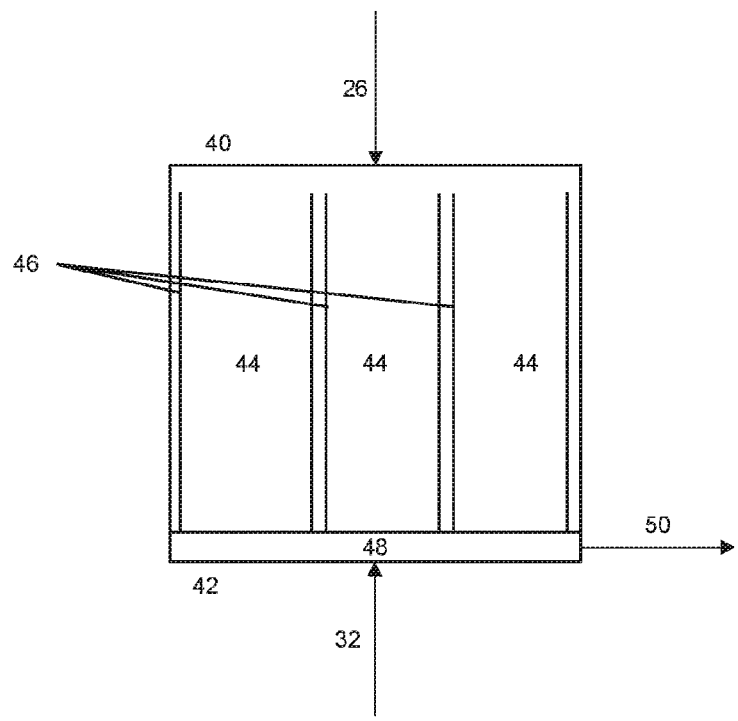
FIG. 4 is a schematic depicting an exemplary reaction process in the reaction vessel.

As depicted in the exemplary process of FIG. 4, the sodium carbonate stream 26 may be fed into the top 40 of the reaction vessel 34. The carbon dioxide stream 32 may then fed into the bottom 42 of the reaction vessel. Other arrangements for providing these materials to the reaction vessel are however envisaged. For instance they may be fed simultaneously or separately via the same inlet. Typically however they are respectively provided to the reaction vessel via separate inlets. The arrangement shown in FIG. 4 advantageously maximises the contact of the carbon dioxide stream 32 with the sodium carbonate stream 26 to the ensures that at least a portion of the carbon dioxide stream 32 dissolves in the sodium carbonate stream 26 to form a reaction solution 44. The reaction vessel 34 may comprise a plurality of cylinders 46 which contains the reaction solution 44. However, other vessel types and/or arrangements are not excluded.

Preferably, from 10 to 90% by weight of the sodium carbonate in sodium carbonate stream 26 reacts with carbon dioxide 32 to form sodium bicarbonate in the reaction solution 44. For instance, from 30 to 60% by weight of the sodium carbonate in sodium carbonate stream 26 may react. In an exemplary embodiment, around 50% by weight of the sodium carbonate in the sodium carbonate stream 26 reacts with carbon dioxide 32. The sodium bicarbonate formed precipitated out of the reaction solution 44 to form slurry 48. Without wishing to be bound by theory, it is thought that the sodium bicarbonate product is less soluble in the reaction solution 44 than sodium carbonate under reactor conditions. As such, as the reaction proceeds, provided the amount of water and concentration of solutes is controlled, the sodium bicarbonate will precipitate as a solid to form an aqueous slurry 48 of sodium bicarbonate. Controlling the reaction to ensure precipitation of the sodium bicarbonate out of solution is understood to advantageously drive the reaction equilibrium towards sodium bicarbonate in the direction of the forward reaction according to Equation 1. However, it will be appreciated that some sodium bicarbonate will typically remain dissolved in the reaction solution. In some embodiments, a concentration gradient of dissolved sodium bicarbonate within the reaction solution 44 may be observed, for instance if the system was operated as a plug flow system. There may be a portion of the reaction solution 44 adjacent sodium carbonate stream 26 at the top 40 of the reaction vessel 34 which comprises comparatively less sodium bicarbonate, compared to the portion of the reaction solution 44 at the bottom 42 of the reaction vessel 34 adjacent the slurry 48. The concentration of sodium bicarbonate in the reaction solution 44 may vary by up to 60% between the bottom and top portions of the reaction solution.

The reaction solution was agitated by bubbling of carbon dioxide stream 32 through sodium carbonate stream 26. However, the reaction solution may be agitated by any other suitable method known to the skilled person, including, but not limited to, baffles, rotors, impellers, and shakers.

The solid sodium bicarbonate may be allowed to sink to the bottom of the reaction vessel 34 to form a slurry 48 at the bottom of the vessel. In the exemplary embodiment, the slurry 48 was then advantageously extracted from the bottom 42 of the reaction vessel 34 to form slurry stream 50. Slurry stream 50 comprised precipitated solid sodium bicarbonate along with residual aqueous reaction solution (i.e. the mother liquor) comprising aqueous sodium carbonate, sodium bicarbonate and carbon dioxide. From herein the residual reaction solution is referred to as "liquor" 52.

Figure 2:
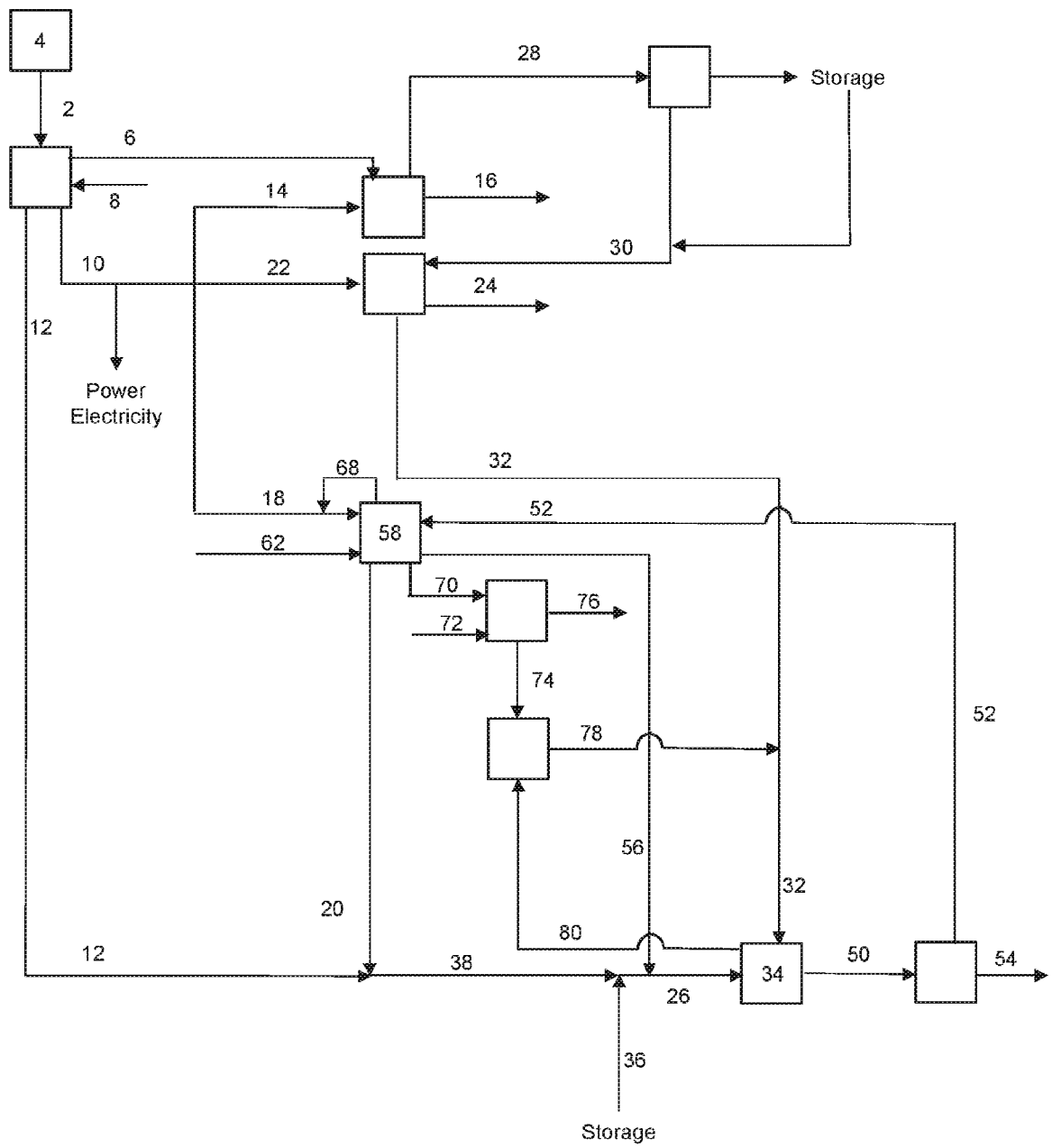
FIG. 2 is a schematic depicting a method according to the present invention, showing recycling of liquor and carbon dioxide streams.

As depicted in FIGS. 1 and 2, the liquor 52 is extracted from slurry stream 50. The slurry stream 50 may be centrifuged, vacuum filtered, filtered, treated in a hydrocyclone or such like, or subject to any other suitable method to extract liquor 52. In the exemplary embodiment, separation of the liquor 52 from the slurry 50 led to the isolation of a sodium bicarbonate slurry cake 54. Slurry cake 54 may be subjected to further extraction to extract more liquor 52 if required. In embodiments, the slurry stream 50 and/or slurry cake is cooled prior to separation. This is advantageous as it promotes precipitation of further sodium bicarbonate, thereby increasing the yield of the process.

Slurry cake 54 is subsequently dried to afford the solid sodium bicarbonate product. The slurry cake may be thermally dried, air, dried under reduced pressure, or by any other suitable method. The slurry cake 54 may be thermally dried in an oven, a kiln, or any other suitable means. The heat for the thermal drying step may optionally be provided by a portion of steam stream 10, either by direct contact or heat exchanger. Preferably, the damp solid cake is heated to between 30 and 150° C., more preferably to between 40 and 100° C. and most preferably to around 80° C. to afford the solid dried sodium bicarbonate product.

The liquor 52 extracted from slurry stream 50 contained high concentrations of dissolved sodium bicarbonate along with levels of sodium carbonate and carbon dioxide. Liquor 52 can therefore be recycled into the reaction vessel 34 as a source of $CO_2$, sodium carbonate as well as sodium bicarbonate. Advantageously, recycling at least a portion of liquor 52 increases the overall yield of the sodium bicarbonate reaction, as this reduces waste. For liquor 52 to be a useful feedstock to the reaction vessel 34, the concentration of sodium bicarbonate must be reduced therein. Liquor 52 may comprise up to 5 M sodium bicarbonate. Alternatively, liquor 52 may comprise to up to 2.5 M sodium bicarbonate. Alternatively liquor 52 may comprise up to 1.3 M sodium bicarbonate. The liquor 52 may also comprise sodium carbonate and dissolved carbon dioxide.

Figure 5:
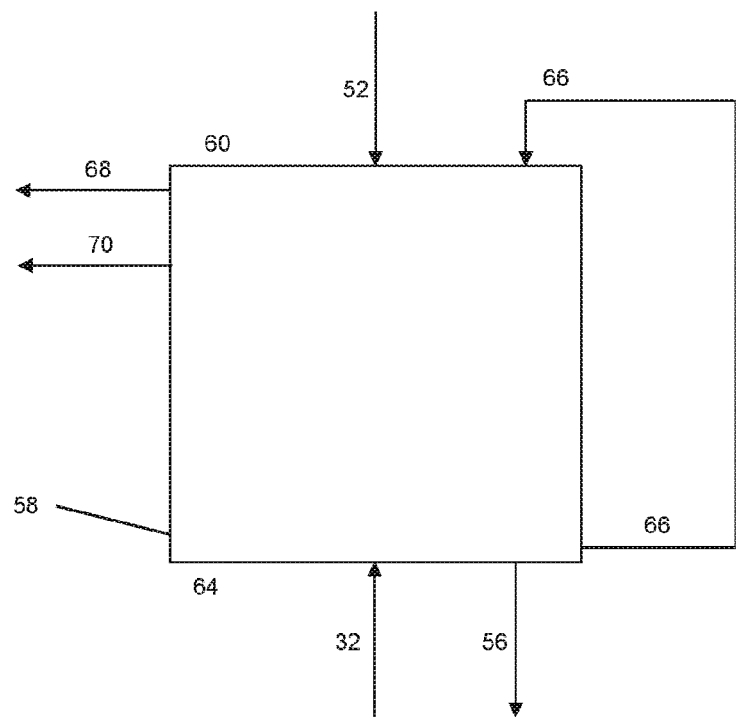
FIG. 5 is a schematic depicting a liquor recycling process according to the invention.

As depicted in FIGS. 2 and 5, at least a portion of liquor 52 may be treated to reduce the concentration of sodium bicarbonate so as to produce liquor stream 56 having a reduced level of sodium bicarbonate relative to liquor 52. During this step, sodium bicarbonate in liquor 52 is converted back into sodium carbonate, carbon dioxide and water. In this example this was performed by thermal decomposition of the sodium bicarbonate to form sodium carbonate e.g. by calcination. The heat for this step may advantageously be supplied by the steam stream 10 produced by the exothermic step of treating the carbonaceous feedstock.

At least a portion of the liquor 52 may be purged (not illustrated) and not treated as described above, in order to remove unreactive impurities introduced by the sodium carbonate source provided by the sodium carbonate feed 36. For example, the liquor 52 may comprise inorganic salts, such as sodium chloride, and/or other impurities which are not required in reaction vessel 34 but which may accumulate in the process.

Preferably, liquor 52 is treated such that the overall amount of sodium bicarbonate in liquor stream 56 is less than 15 w/v %, preferably less than 10 w/v % and most preferably less than 7 w/v %. The heat required for thermal decomposition of the sodium bicarbonate may be provided by one or more portions of steam stream 10. As shown in FIG. 2, the heat required for the thermal decomposition of the sodium bicarbonate was provided by a portion 18 of steam stream 10, although other sources of heat are contemplated. Due to heat transfer, the portion 18 of steam stream 10 subsequently cools and condenses to form third condensate stream 20. Third condensate stream 20 may provide water to the first water stream 8. As depicted in FIG. 2, the third condensate stream 20 may alternatively or additionally be used to provide water to the water stream 38 and therefore to aqueous sodium carbonate stream 26.

As depicted in FIG. 5, liquor 52 may be fed into the top 60 of a decarbonator column 58 against a heated gas stream 62. In this example, the liquor 52 is passed down the column 58 to the bottom 64 of the column 58. Liquor 52 is extracted from the bottom 64 of column 58 and is heated to produce heated liquor stream 66. The heat may be provided by a portion 18 of steam stream 10. The heated liquor stream 66 may then be fed back into the top 60 of the column 58 for a second passage down the column to flash-off steam 68 and other off-gases 70. The steam 68 produced may be passed into portion 18 of steam stream 10 to heat the heated gas stream 62; and/or be condensed and used to supplement third condensate stream 20.

The liquor stream 56 obtained at the end of the column following a second passage is preferably greater than 80° C. in temperature, more preferably greater than 90° C. and most preferably greater than 95° C. The liquor stream 56 obtained at the end of the column following a second passage comprises sodium carbonate, and may be used to supplement aqueous sodium carbonate stream 26.

The off-gases 70 driven off from the liquor 52 may include carbon dioxide and water. The carbon dioxide in off-gases 70 may be recovered as a $CO_2$ off-gas for supply to the reaction vessel 34. The off-gases 70 are typically however too hot to be introduced directly into the reaction vessel 34 and therefore typically require cooling.

As depicted in FIG. 2, the carbon dioxide in off gases 70 may be cooled to afford a heated water stream 76 and a cooled carbon dioxide stream 74. Heat exchange may take place in any suitable form of heat exchanger apparatus known to one skilled in the art (e.g. a plate, plate-fin or shell and tube heat exchanger). FIG. 2 depicts using a second water stream 72 to cool off gases 70 to produce a cooled carbon dioxide stream 74 and heated water stream 76. Preferably, the second water stream 72 is less than 25° C. The second water stream 72 may be provided by river water, sea water, reservoir water, or by any other suitable source of water. Preferably, the first water stream 8 may comprise water from the heated water stream 76. Cooled carbon dioxide stream 74 may then be reintroduced into reaction vessel 34. FIG. 2 depicts cooled carbon dioxide stream 74 compressed to form stream 78, wherein stream 78 is fed into vaporised carbon dioxide stream 32, which is in turn fed into reaction vessel 34 for re-use.

Carbon dioxide that is not consumed in the reaction vessel 34 may be recycled. FIG. 2 depicts a carbon dioxide waste stream 80 consisting of unreacted $CO_2$ being compressed and introduced into stream 78. The compressed carbon dioxide 78 may then be introduced into vaporised carbon dioxide stream 32 to re-enter reaction vessel 34 in the same way as the first carbon dioxide stream 74, as described above.

It will be appreciated that numerous modifications to the above described embodiments may be made without departing from the scope of the invention, as defined in the appended claims.

The described and illustrated embodiments are to be considered as illustrative and not restrictive in character, it being understood that only the preferred embodiments have been shown and described and that all changes and modifications that come within the scope of the invention, as defined in the appended claims, are desired to be protected.

It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary. Throughout this specification, the term "comprising" or "comprises" means including the component(s) specified but not to the exclusion of the presence of others. The term "comprising" also encompasses within its scope the terms "consists essentially of", and "consists of" and any mention of "comprising" in the context of the present invention may thus be replaced in embodiments of the invention by the term "consists essentially of", or "consists of". Where "v/v %" is used in relation to the compositions of gases, it will be appreciated that this measure is made with reference to dry gases (e.g. excluding the volume of any water vapour contained with the gas), i.e. is calculated on a dry basis.

The invention claimed is:

1. A method for the production of sodium bicarbonate, the method comprising the steps of:
   a. treating a carbonaceous feedstock to form a product stream comprising up to 10 v/v % carbon dioxide;
   b. capturing at least a portion of the carbon dioxide from the product stream to form a carbon dioxide stream;
   c. feeding the carbon dioxide stream to a reaction vessel;
   d. feeding an aqueous sodium carbonate solution to the reaction vessel;
   e. contacting at least a portion of the carbon dioxide stream with at least a portion of the aqueous sodium carbonate solution to form a slurry comprising solid sodium bicarbonate;
   f. separating the solid component of the slurry from the liquid component of the slurry to provide solid sodium bicarbonate and an aqueous liquor;
   wherein capturing at least a portion of the carbon dioxide from the product stream comprises the steps of: contacting the product stream with a solvent; absorbing carbon dioxide from the product stream into the solvent to form a carbon dioxide enriched solvent; and desorbing carbon dioxide from the carbon dioxide enriched solvent to form the carbon dioxide stream.

2. The method according to claim 1, wherein the concentration of carbon dioxide in the product stream is in the range of from 1-10 v/v %.

3. The method according to claim 1, wherein treating the carbonaceous feedstock comprises combusting the carbonaceous feedstock.

4. The method according to claim 1 wherein the carbonaceous feedstock is a hydrocarbon feedstock, optionally wherein the hydrocarbon feedstock is natural gas.

5. The method according to claim 1 wherein the step of treating the carbonaceous feedstock produces heat and wherein at least a portion of the heat is used to vaporise a first water stream to form a steam stream.

6. The method according to claim 5 wherein at least a portion of the steam stream is condensed to provide a first condensate stream, optionally wherein the process comprises supplying water from the first condensate stream to at least one of:
   a. the first water stream; and
   b. the aqueous sodium carbonate solution.

7. The method according to claim 5, wherein at east a portion of the steam stream is used to generate electricity, optionally wherein the electricity is used to power the apparatus for one or more of the subsequent process steps.

8. The method according to claim 1 wherein the solvent comprises an alkanolamine.

9. The method according to claim 5, wherein desorbing carbon dioxide from the carbon dioxide enriched solvent comprises at least one of heating the solvent and subjecting the carbon dioxide enriched solvent to a reduced pressure.

10. The method according to claim 9 wherein a portion of the steam stream is used to heat the solvent.

11. The method according to claim 1 wherein following capture, the carbon dioxide is liquefied.

12. The method according to claim 1 wherein the carbon dioxide obtained following capture meets the following criteria:
   a. a carbon dioxide content of at least 99.9 v/v %;
   b. a moisture content of at most 20 ppm;
   c. an ammonia content of at most 2.5 ppm;
   d. an oxygen content of at most 30 ppm;
   e, a nitric oxide content of at most 2.5 ppm;
   f. an nitrogen dioxide content of at most 2.5 ppm;
   g. a non-volatile residue (particulate) content of at most 10 ppm;
   h. a non-volatile organic residue (oil and grease) content of at most 5 ppm;
   i. a volatile hydrocarbon content (calculated as methane) of at most 50 ppm (of which at most 20 ppm may be non-methane hydrocarbons);
   j. an acetaldehyde content of at most 0.2 ppm;
   k. an aromatic hydrocarbon content of at most 0.02 ppm;
   l. a carbon monoxide content of at most 10 ppm;
   m. a methanol content of at most 10 ppm;
   n. a carbonyl sulphide content of at most 0.1 ppm;
   o. a hydrogen sulphide content of at most 0.1 ppm; and
   p. a sulphur dioxide content of at most 1 ppm.

13. The method according to claim 1 wherein the carbon dioxide stream fed to the reaction vessel has a carbon dioxide concentration in the range of from 20-90 v/v %.

14. The method according to claim 13 wherein the carbon dioxide stream is formed prior to being fed into the reaction vessel by diluting the captured carbon dioxide with a diluent gas, optionally the diluent gas comprising nitrogen or air.

15. The method according to claim 1 wherein the liquor comprises aqueous sodium bicarbonate and aqueous sodium carbonate.

16. The method according to claim 15 wherein the liquor is heated to convert at least a portion of the aqueous sodium bicarbonate to aqueous sodium carbonate, carbon dioxide and water, or wherein the liquor is cooled to cause sodium bicarbonate to precipitate out of solution.

17. The method according to claim 16 wherein the heat is provided by a portion of the steam stream.

18. The method according to claim 3, wherein the combusting occurs in a combined heating and power plant ("CHP").

19. The method according to claim 8, wherein the alkanolamine is selected from the group consisting of N-methyldiethanolamine (MDEA), 2-amino-2-methyl-1-proponal (AMP), 2-(diethylamino)-ethanol (DEAE), diisopropanolamine (DIPA), methylaminopropylamine (MAPA), 3-aminopropanol (AP), 2,2-dimethyl-1,3-propanediamine (DMPDA), 3-amino-1-cyclohexylaminopropane (ACHP), diglycolamine (DGA), 1-amino-2-propanol (MIPA), 2-methyl-methanolamine (MMEA), monoethanolamine, diglycolamine, and mixtures thereof.

20. The method according to claim 10, wherein the provision of heat to the solvent by the steam stream condenses at least a portion of the steam stream to form a second condensate stream.

21. The method according to claim 20 wherein the second condensate stream provides water for at least one of:
   a. the first water stream; and
   b. the aqueous sodium carbonate solution.

22. The method according to claim 17, wherein the provision of heat by the steam stream to the liquor condenses a portion of the steam stream to form a third condensate stream.

23. The method according to claim 22 wherein the process comprises supplying water from the third condensate stream to at least one of:
   a. the first water stream; and
   b. the aqueous sodium carbonate solution.

* * * * *